US010496677B2

(12) United States Patent
Voss et al.

(10) Patent No.: US 10,496,677 B2
(45) Date of Patent: Dec. 3, 2019

(54) TENANT DATABASE REPLICATION

(71) Applicant: SAP SE, Walldorf (DE)

(72) Inventors: Stefan Voss, Potsdam (DE); Reiner Singer, Schriesheim (DE); Markus Behrens, Weinheim (DE); Frank Huber, Berlin (DE); Tilman Giese, Livermore, CA (US); Uwe Hahn, Berlin (DE); Werner Thesing, Lautertal (DE); Eduard Bartsch, Hockenheim (DE)

(73) Assignee: SAP SE, Walldorf (DE)

(*) Notice: Subject to any disclaimer, the term of this patent is extended or adjusted under 35 U.S.C. 154(b) by 268 days.

(21) Appl. No.: 15/589,720

(22) Filed: May 8, 2017

(65) Prior Publication Data
US 2018/0322184 A1 Nov. 8, 2018

(51) Int. Cl.
G06F 17/30 (2006.01)
G06F 16/27 (2019.01)
G06F 11/14 (2006.01)
G06F 16/23 (2019.01)

(52) U.S. Cl.
CPC ........ *G06F 16/275* (2019.01); *G06F 11/1474* (2013.01); *G06F 16/2358* (2019.01); *G06F 16/273* (2019.01); *G06F 16/278* (2019.01); *G06F 2201/80* (2013.01)

(58) Field of Classification Search
CPC ....................................................... G06F 16/27
USPC .................................... 707/999.01, 635, 638
See application file for complete search history.

(56) References Cited

U.S. PATENT DOCUMENTS

| 2007/0156699 | A1* | 7/2007 | Becker | G06F 16/958 |
| 2008/0168536 | A1* | 7/2008 | Rueckwald | H04L 51/12 726/4 |
| 2009/0313311 | A1* | 12/2009 | Hoffmann | G06F 11/2094 |
| 2018/0253481 | A1* | 9/2018 | Heidel | G06F 11/1469 |

* cited by examiner

*Primary Examiner* — Baoquoc N To
(74) *Attorney, Agent, or Firm* — Jones Day

(57) ABSTRACT

Replicating a tenant database includes receiving at a source system a first request from a target system for replicating a first tenant database of the source system, which includes one or more first servers. Characteristics of the one or more first servers are sent to the target system to generate at the target system a second tenant database including one or more second servers. Each second server corresponds to one first server and has the same characteristics as the corresponding first server. Information from each first server is replicated, in an asynchronous mode, to the corresponding second server through a communication channel that is established between each first server and the second server. Upon receiving a second request for stopping the replication, a synchronous mode of processing statements from client applications of the first tenant database is entered. Related apparatus, systems, techniques and articles are described.

20 Claims, 13 Drawing Sheets

TENANT DATABASE REPLICATION

TECHNICAL FIELD

The subject matter described herein relates in general to field of computer database systems. More specifically, the disclosed subject matter relates to tenant databases and replicating or moving tenant databases between database systems in the context of database system replication and recovery.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter and as part of its recovery efforts, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database. Some database systems include multiple databases, for example tenant database In this case, data replication and/or system recovery may require replicating or moving a tenant database from one database system to another database system.

SUMMARY

In one aspect, provided herein are methods for replicating a tenant database from a source system to a target system. Related apparatus, systems, techniques and articles are also described. In some embodiments, the method includes receiving, at a source system, a first request from a target system for replicating a first tenant database of the source system. The first tenant database includes one or more first servers. Characteristics of the one or more first servers included in the first tenant database are then sent to the target system to generate at the target system a second tenant database including one or more second servers. Each second server corresponds to one first server and has the same characteristics as the corresponding first server. A communication channel is then established between each first server and the corresponding second server and information from each first server is replicated, in an asynchronous mode, to the corresponding second server through the communication channel. Upon receiving a second request for stopping replication of the first tenant database to the second tenant database, a synchronous mode of processing statements from client applications of the first tenant database is entered.

In some embodiments, the method further includes receiving a statement from a client application of the first tenant database. A transaction log is generated based on the statement and sent to the target system to replay the transaction log at the second tenant database of the target system. In response to processing the statement by first tenant database, information is sent to the client application that indicates completion of processing the statement.

In some embodiments, the entering a synchronous mode of processing statements from client applications of the first tenant database includes in response to receiving a first notification indicating successful replication of the transaction log at the target system, processing the statement by the first tenant database In some embodiments, the method further includes processing the statement by first tenant database in the asynchronous mode prior to entering a synchronous mode of processing statements from client applications of the first tenant database. In some embodiments, in the asynchronous mode the statement is processed by the first tenant database without waiting for a first notification indicating successful replication of the transaction log at the second tenant database of the target system.

In some embodiments, the method further includes prior to entering a synchronous mode of processing statements from client applications of the first tenant database, receiving a second notification indicating successful replication of the information of the one or more first servers to the corresponding one or more second servers. In some embodiments, the second notification further indicates that the persistence of the replicated information from each first server to the corresponding second server has been initialized on the corresponding second servers. In some embodiments, a persistence flag is included in the second notification to indicate whether the persistence of the replicated information from each first server to the corresponding second server has been initialized on the corresponding second servers.

In some embodiments, in response to receiving the second request the shutdown of the first tenant database is initiated upon completion of the synchronous mode of processing statements from client applications of the first tenant database. In some embodiments, in response to receiving the second request, a third request is sent to the target system to restart the second tenant database, and in response to receiving a third notification from the target system indicating a successful restart of the second tenant database, client applications of the first tenant database are informed to redirect requests to the second tenant database of the target system.

In some embodiments, the source system includes a first system database and the target system includes a second system database, and the first request is received by the first system database from the second system database. In some embodiments, the source system includes a first name server that hosts the first system database and stores information associated with the first tenant database, and the stored information associated with the first tenant database includes landscape information associated with the source system.

In some embodiments, the target system includes a second name server that hosts the second system database and stores information associated with the second tenant database, and the stored information associated with the second tenant database includes landscape information associated with the target system. In some embodiments, the first tenant database includes a first index server that stores topology information associated with the first tenant database, and the second tenant database includes a second index server that stores topology information associated with the second tenant database.

In some embodiments, topology information associated with a tenant databases includes information corresponding to tables associated with the tenant database, and information corresponding to table partitions associated with the tenant database. In some embodiments, the second notification indicating successful replication of the information of the one or more first servers to the corresponding one or more second server is received by the first index server of the first tenant databases from the second index server of the second tenant database.

In some embodiments, the establishing a communication channel between each first server and the corresponding second server includes sending to the first server and the corresponding second server information that indicates a port of the communication channel.

In some embodiments, the source system and target system communicate via a secure mutual authentication. The secure mutual authentication includes: sending a temporary certificate and a key from the source system to the target system via a secure communication channel. The temporary certificate is installed on the target system. Communications between the source system and the target system are authenticated through the temporary certificate that is generated on the source system based on user credentials. The user credentials are associated with a user who is authorized to access the source system and the target system.

In another aspect, computer-implemented systems for replicating a tenant database from a source system to a target system are provided herein that include one or more data processors and a computer-readable storage medium encoded with instructions for commanding the one or more data processors to perform any of the methods disclosed herein.

In yet another aspect, computer program products for replicating a tenant database from a source system to a target system are provided herein that include a non-transitory machine-readable medium storing instructions that, when executed by at least one data processor, cause the at least one data processor to perform any of the methods disclosed herein.

Non-transitory computer program products (i.e., physically embodied computer program products) and/or non-transitory computer-readable storage media are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc. Related apparatus, systems, techniques, and articles are also described.

The subject matter described herein provides many technical advantages. Advantages of the subject matter described herein include that it allows replicating or moving one or more tenant databases of a database system without the need of replicating the entire database system. In particular, the disclosed subject matter allows eliminating any database system downtime when replicating or moving a tenant database between systems while minimizing the computational cost associated with such replication. In some embodiments, a tenant database can be replicated or moved while the database systems stay online. For example, if a tenant database of a database system increases in size or complexity, it can be moved to another database system for load balancing purpose. Thus, it allows for efficient load balancing between database systems and avoids the inefficient and costly replication mechanism of backing up and subsequently restoring the system. The disclosed subject matter also provides a general solution of replicating tenant database that is not hardware specific. It further provides for copying a template or productive tenant database to a customer's database system or a test landscape system. The subject matter as described herein further allows for tenant-specific software upgrades or feature switching of tenant databases in cloud-based database systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
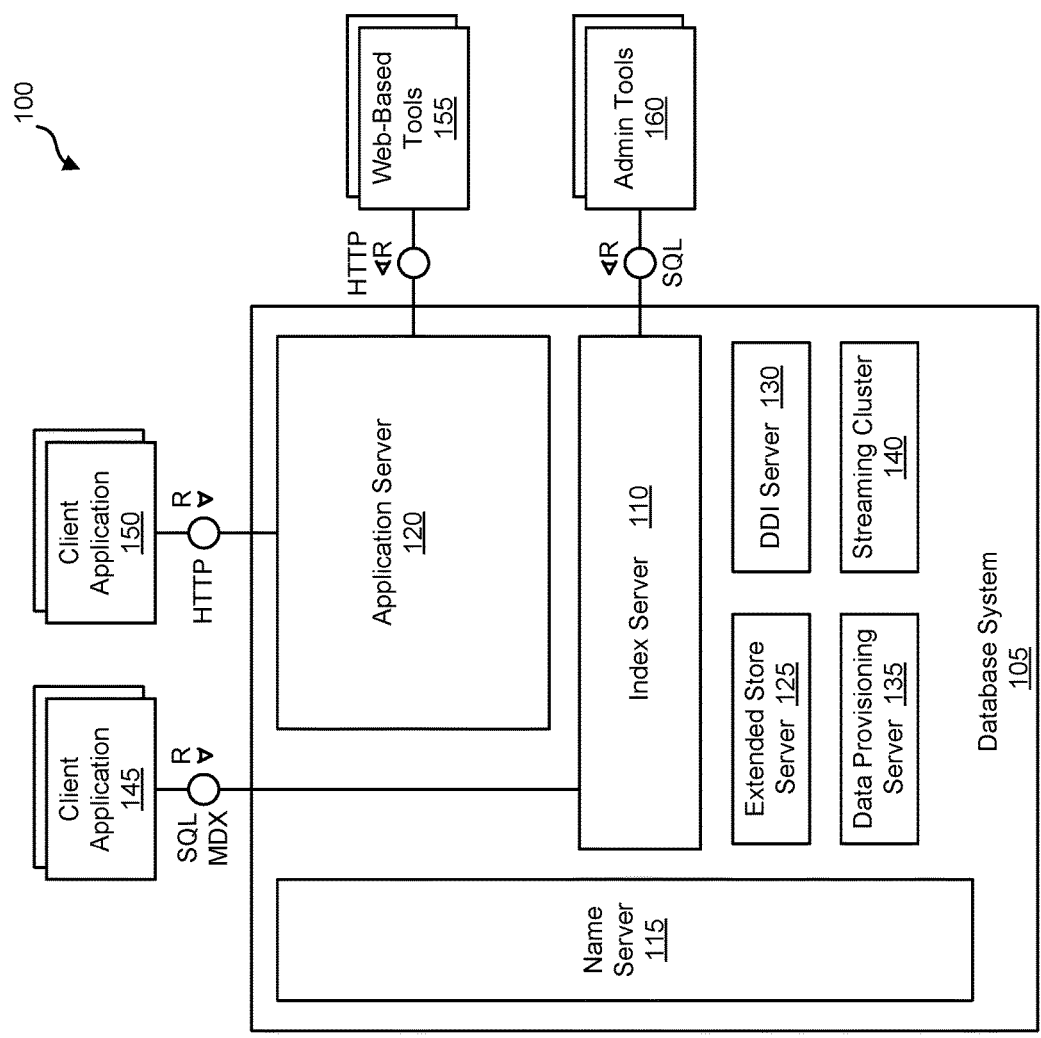
FIG. 1 is a system diagram illustrating an example database system for use in connection with a metadata catalog.

For many of their client applications, database systems may be required to support operations on a 24/7 schedule, and database systems may be required to provide a guaranteed maximum amount of downtime, during which a database system is not able to fully support ongoing operations. When a system is required to ensure an agreed level of operational performance, it may be referred to as a high availability system ("HA").

Hot-standby systems are typically used to guarantee substantially continuous uptime with no, or very little, downtime. A hot-standby system, or a backup system, is a database system that may be activated quickly in the event of a disruption causing one or more functions of a primary operational database system to fail. Such a disruption may be referred to as a disaster, and the process of restoring a database system to full operations may be referred to as disaster-recovery ("DR").

Some databases may utilize replication to improve reliability and availability of the database. If data replication is implemented, the database system may include a first datacenter and a second datacenter. The first datacenter may include a processor and memory sufficient to store the data associated with the database. The first datacenter (or primary system) may store a first (primary) copy of the data associated with the database. The second datacenter may also include a processor and memory sufficient to store the data associated with the database. The second datacenter (or secondary system) may store a second (backup) copy of the data associated with the database. In some implementations, the database may include more than two datacenters (e.g., three or four datacenters).

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the workload between the two systems (known as load balancing). Such a situation may be referred to as Active/Active (AA) operation since the first datacenter and the second datacenter both actively respond to queries at the same time.

Logging is then typically used to communicate data or metadata between a primary database system and the various additional systems or for restoring a database system recovering from a disaster. Logging refers to creating and maintaining a log that lists any changes to the state of a database system. For example, logging can be used to prevent loss of persistent data in a database system.

Some database systems, such as SAP HANA®, support multiple isolated databases in a single database system. These isolated databases are referred to as multitenant database containers or tenant databases within the overall system or multi-container system architecture. Thus, a database system or system architecture in multiple-container mode is capable of containing one or more tenant databases. In some embodiments, a multi-container system architecture can be converted to a single-container system that includes only one tenant database.

The subject matter described herein discloses methods, apparatus, systems, techniques and articles that may provide replicating or moving a tenant database between database systems that minimizes the downtime of the database systems or system architecture. In some embodiments, the database systems stay online while replicating or moving the tenant database. While online, the database system can still be accessed by clients or other users, and the replication does not affect the operation of the database system. In some embodiments, methods, apparatus, systems, techniques and articles disclosed herein replicate, in an asynchronous mode, information from each first server included in a first tenant database of a source system to the corresponding second server included in a second tenant database of a target system through a communication channel. Upon request to stop replication of the information, a synchronous mode of processing statements from client applications of the first tenant database is then entered.

Database Systems

FIG. 1 is a diagram 100 illustrating a database system 105 that can be used to implement aspects of the current subject matter, according to some embodiments. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to nm web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
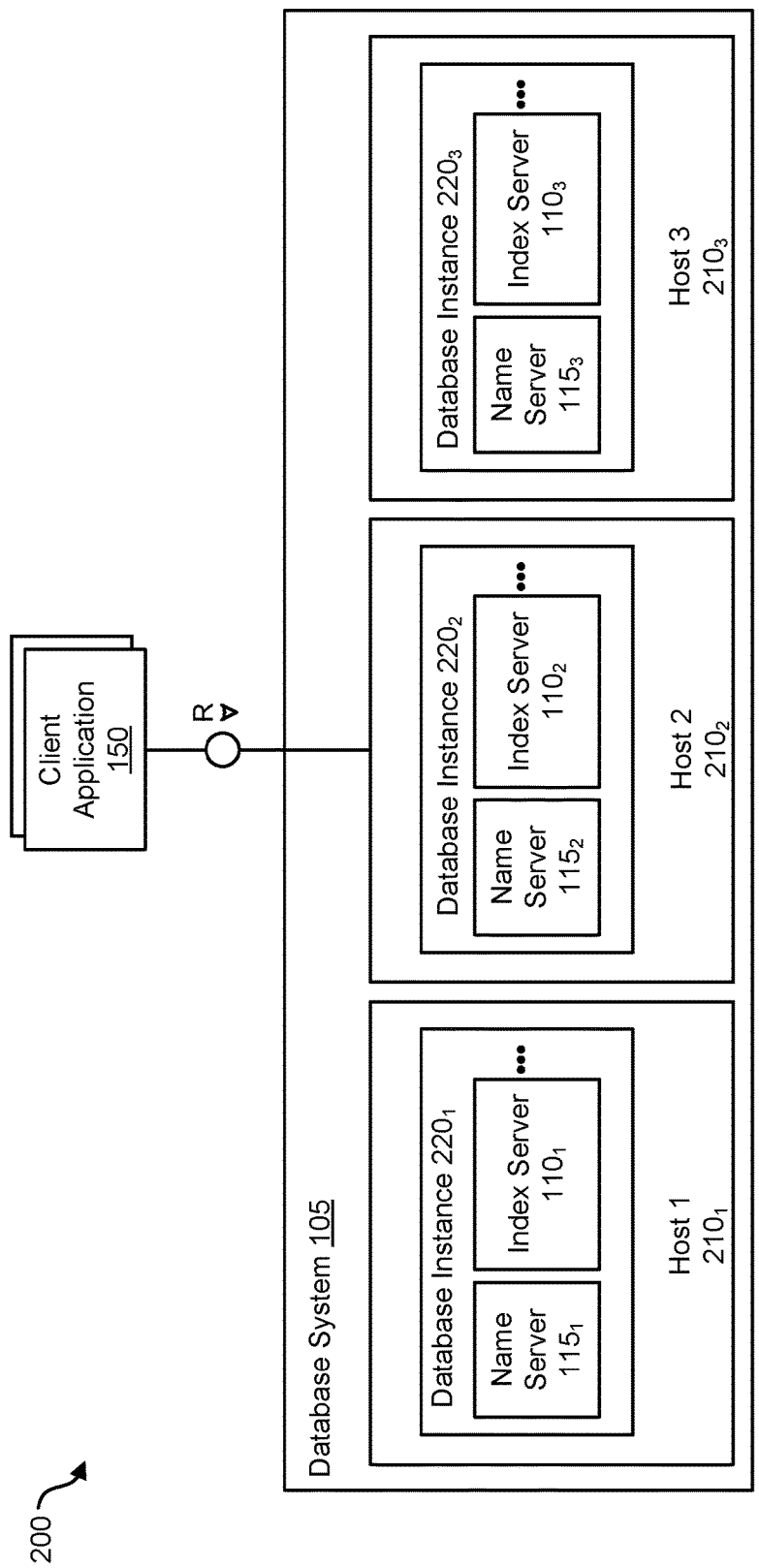
FIG. 2 is a system diagram illustrating a distributed database system having a plurality of database instances for use in connection with a metadata catalog.

FIG. 2 is a diagram 200 illustrating a variation of the database system 105 that can support distribution of server components across multiple hosts for scalability and/or availability purposes, according to some embodiments. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $100_{1\text{-}3}$, $120_{1\text{-}3}$, in the system, if required.

As is illustrated in FIG. 2, the distributed database system 105 can be installed on more than one host $210_{1\text{-}3}$. Each host $210_{1\text{-}3}$ is a machine that can comprise at least one data processor (e.g., a CPU, etc.), memory, storage, a network interface, and an operation system and which executes part of the database system 105. Each host $210_{1\text{-}3}$ can execute a database instance $220_{1\text{-}3}$ which comprises the set of components of the distributed database system 105 that are installed on one host $210_{1\text{-}3}$. FIG. 2 shows a distributed system with three hosts, which each run a name server $110_{1\text{-}3}$, index server $120_{1\text{-}3}$, and so on (other components are omitted to simplify the illustration).

Index Server

Figure 3:
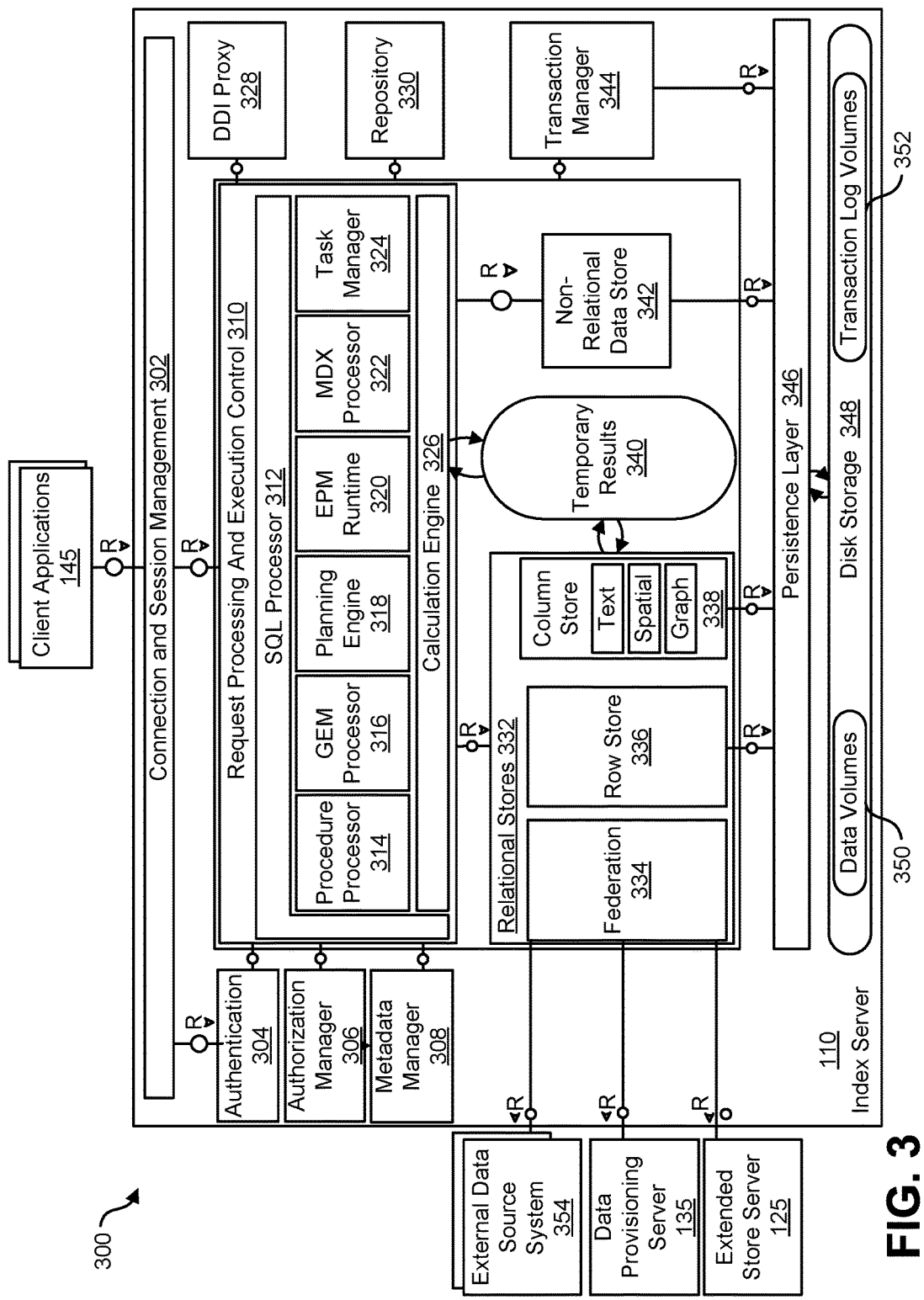
FIG. 3 is a system diagram of an index server forming part of the database system of FIG. 1.

FIG. 3 is a diagram 300 illustrating an architecture for the index server 110 (which can, as indicated above, be one of many instances) forming part of the database system of FIG. 1, according to some embodiments. A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems and multi-component systems, central metadata can be shared across servers (and tenant databases), and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persistent objects can be loaded via their persistent object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persistent data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Recovery Systems

Figure 4:
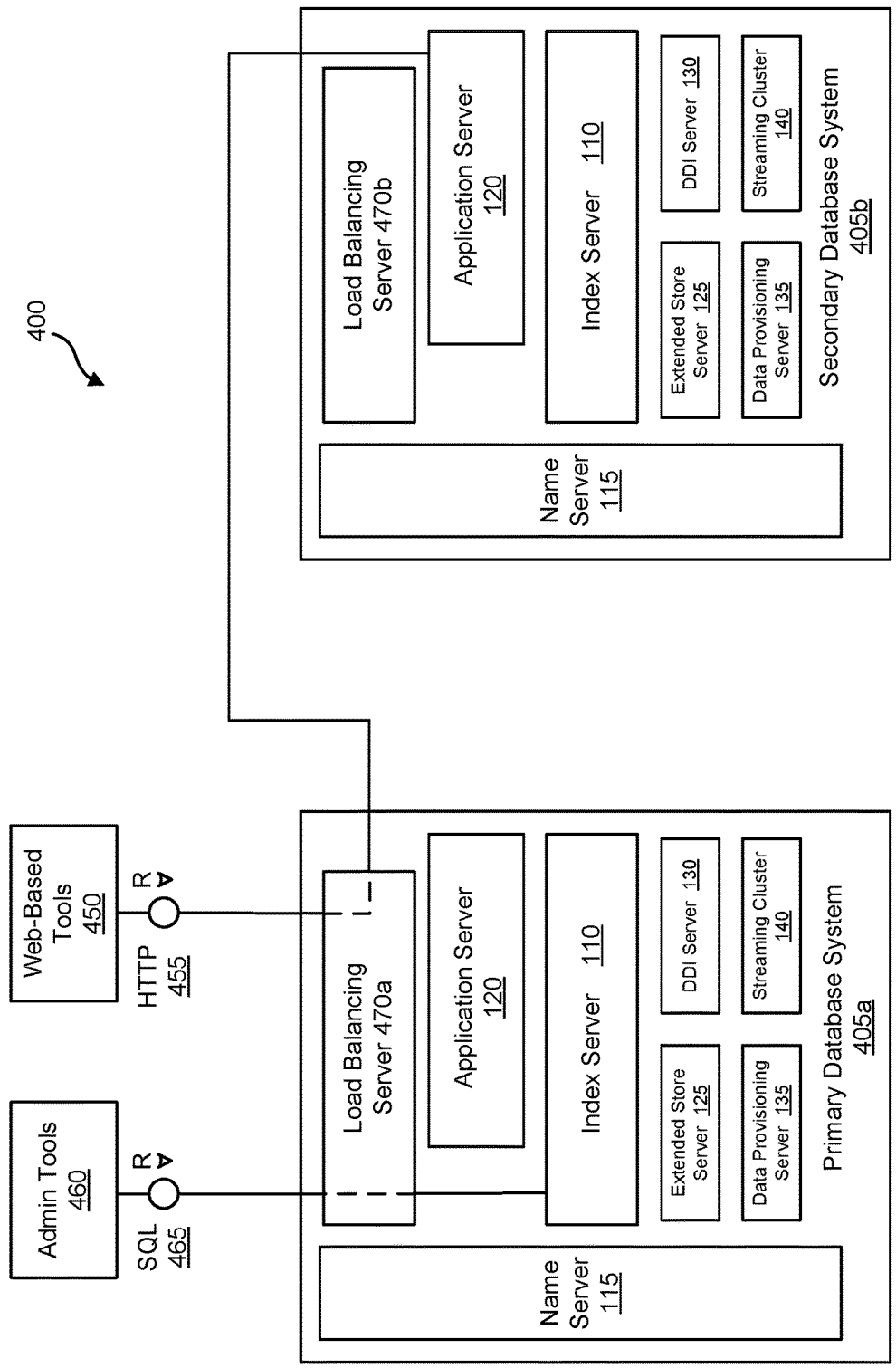
FIG. 4 is a system diagram illustrating an architecture for use in connection with a metadata catalog, which includes a primary database system and a secondary database system that serves as hot-standby to primary database system.

FIG. 4 is a system diagram illustrating an architecture 400 to support load balancing between a primary database system, or primary system 405a and a secondary database system, or secondary system 405b, which serves as hot-standby to primary system 405a, according to some embodiments. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405*a*, sending requests to the secondary system 405*b* as necessary to maintain a well distributed workload.

As depicted in FIG. 4, each of the primary system 405*a* and the secondary system 405*b* includes a load balancing server 470*a* and 470*b* which respectively receive requests from user applications directed to the primary system 405*a* or the secondary system 405*b*. Such request may come from either admin tools 460 or web-based tools 450, or any other user application. Upon receiving a request a load balancing server, e.g. 470*a*, determines how to distribute the workload. As depicted load balancing server 470*a* routes an SQL request 465 from admin tools 460 to the index server 110 of the primary system 405*a*, while routing an HTTP request 455 from web-based tools 450 to the application server 120 of the secondary system 405*b*.

Load balancing of resources between a primary system 405*a* and a secondary system 405*b* can give rise to a number of complicating issues. For example, if either of the requests 455, 465 requires writing to one or more data tables, or modifying a data table, then the two systems 405*a*, 405*b* will diverge. After many instances of write requests being distributed between the primary system 405*a* and the secondary system 405*b*, the two systems would be substantially different, and likely unusable. In another example, an application request, e.g., 465, may perform a write transaction that is followed by a read transaction, e.g., 455, related to the data written by the write request 465. If the write request is allocated to the primary system 405*a*, the read request would obtain a different result depending on whether the subsequent read transaction is carried out by the primary system 405*a* or by the secondary system 405*b*.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
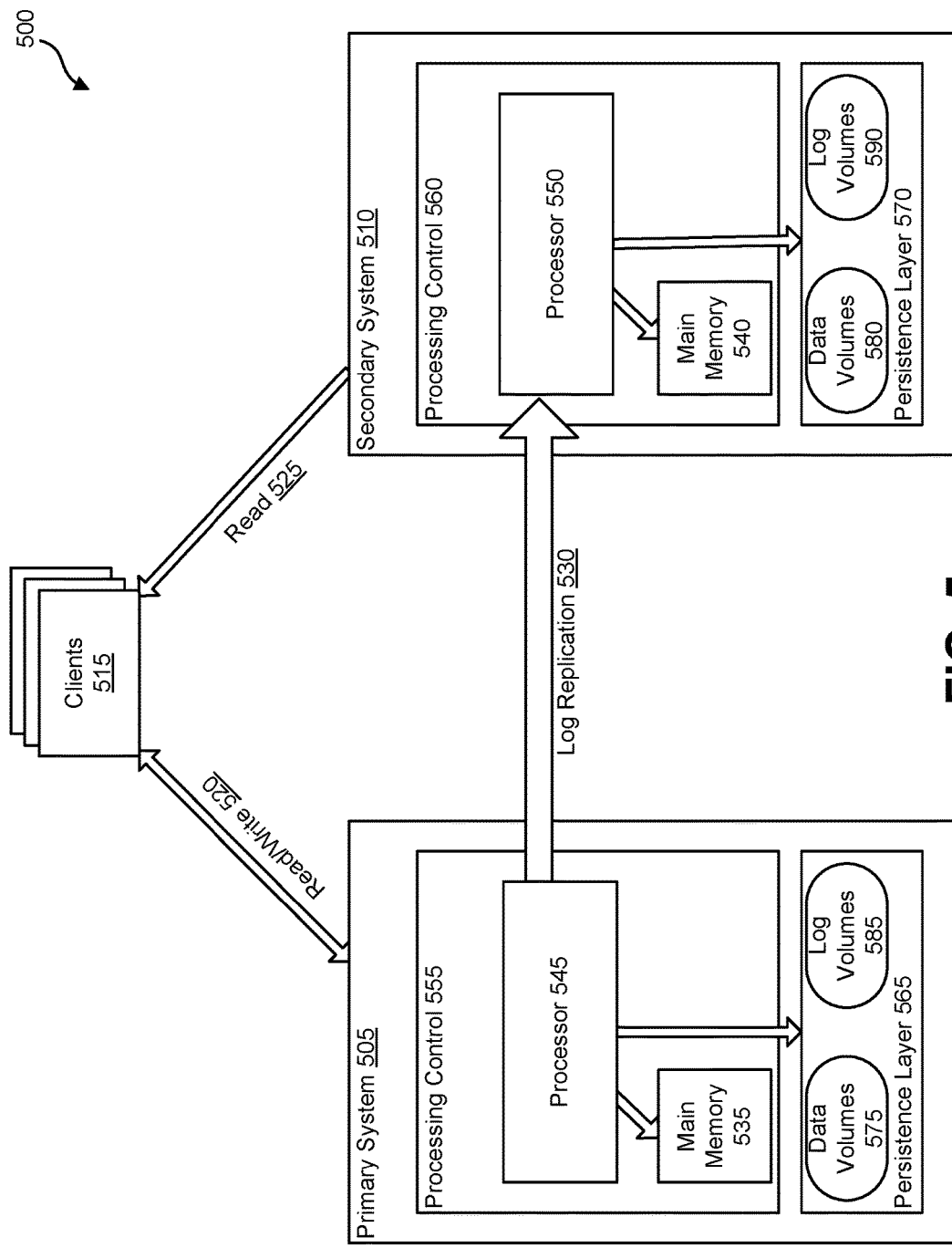
FIG. 5 is a system diagram illustrating a high-availability/disaster-recovery (HA/DR) database systems for use in connection with a metadata catalog

FIG. 5 illustrates a HA/DR system 500 for use in connection with a metadata catalog, according to some embodiments. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. The time it takes after a disaster to restore full, or minimum, functionality of a data system, for example by bringing a hot-standby online, is referred to as recovery time. Secondary system 510 may be a hot-standby, ready to come online with minimal recovery time so as to minimize downtime. In an effort to minimize recovery time, and thereby downtime, in some embodiments, the secondary system in a state just short of fully operational. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505.

Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response or notification. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. In some embodiments, secondary system 510 may be kept in a state substantially close to the same state as the primary system 505 such that the workload required by many operations can be supported by the secondary 510. The HA/DR system depicted in FIG. 5 typically requires separately implementing the primary system 505 and the secondary system 510. The primary system 505 and the secondary system 510 are then administered and run independently, thus requiring additional computer resources and cost. These are just a few of the issues to be addressed in order to provide a simpler and more cost-effective solution for replicating tenant databases within a HA/DR architecture or between database systems in general. One or more solutions to these issues are now addressed.

Tenant Databases

Figure 6:
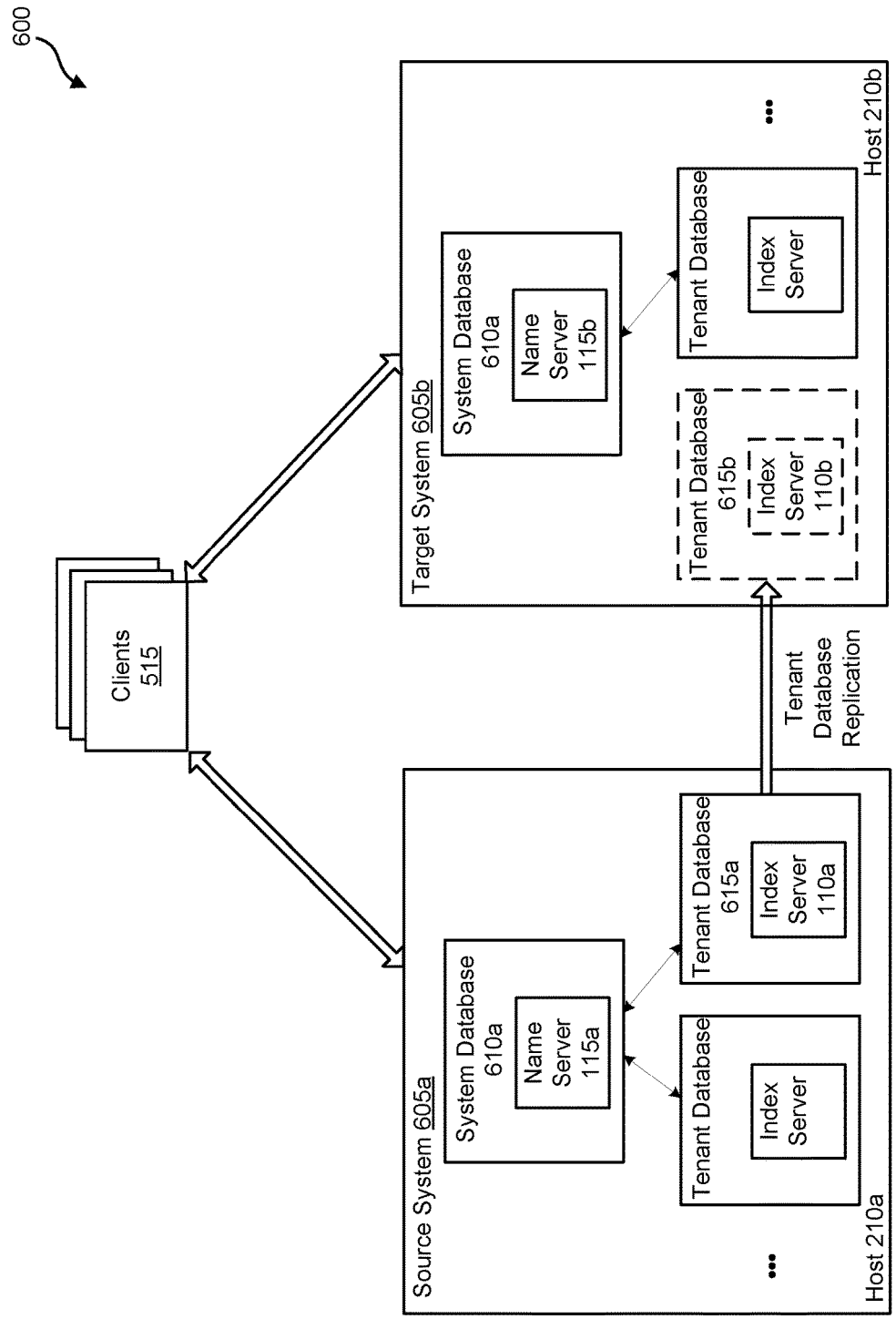
FIG. 6 is a system diagram illustrating an architecture for replicating a tenant database from a source system to a target system.

FIG. 6 is a system diagram illustrating an architecture 600 of a source database system, or source system 605a, and a target database system, or target system 605b for replicating a tenant database from the source system 605a to the target system 605b, according to some embodiments. The source system 605a and the target system 605b each represent a separate database system 605. In some embodiments, the system architecture 600 is used for load balancing between the source system 605a as a primary system and the target system 605b as a secondary system, which may serve as hot-standby to the primary system. In some embodiments, the system architecture 600 may be useful in a high availability data system, or in a disaster recovery system, or in a combination HA/DR system.

A database system 605 of the system architecture 600 may be a single instance system, similar to database system 105 depicted in FIG. 1 (and as illustrated in FIG. 6), or may be a distributed variation of database system 105 as depicted in FIG. 2. The source system 605a and the target system 605b can each include a system database 610a. 610b and one or more tenant databases 615a, 615b, respectively. In some embodiments, the target system 605b includes zero tenant databases. The system database 605a can be used for central system administration of the source system 605a, while the system database 605b may centrally administer the target system 605b.

Implementations of the system architecture 600 can include features of distributed architectures that provide multi-tenant container system support and data distribution that enables scalability. More specifically, the system architecture 600 allows hosting multiple "virtual" systems inside one physical system with isolation of the virtual systems from each other. The system architecture 600 is configured to support isolation of the tenant databases 615 on a database level. Isolation can be achieved by having separate index servers 110, separate disk volumes, and separate data volumes and log volumes for the different tenant databases. In some embodiments, each tenant databases 615 can be served by a single index server that is configured to access data from other tenant databases included in the source system or target system, respectively.

Thus, the source system 605a and/or the target system 605b may be hosted by a single host 210, as depicted in FIG. 6, or by a plurality of hosts, and be distributed across multiple database server processes In some embodiments, the system database 605 is hosted by one host, and the tenant databases 615 run on a separate host. Tenant databases may be isolated from one another and available to be accessed by clients 515 via a network, on a separate host, the same host, or across multiple hosts. A host 210 can be a virtual machine on a larger system or one or more physical processors. Tenant databases can also be distributed across multiple host processes. Data distribution means that tables or ranges within tables are assigned to different database partitions that are assigned to different host processes for scalability reasons. In some embodiments, the source system as the primary system is run in read/write access mode and the target system as the secondary system is configured to be read-only with respect to request received from clients 515, including client applications.

It should be appreciated that the system architecture 600, as illustrated in FIG. 6, is only one example of such architectures replicating a tenant database from a source system to a target system, and that the architecture 600 optionally has more or fewer servers or components than shown, optionally combines two or more servers or components, or optionally has a different configuration or arrangement of the servers or components. The various servers or components shown in FIG. 6 are implemented in hardware, software, or a combination of both, the hardware and software, including one or more signal processing and/or application specific integrated circuits. Additional details regarding an example implementation of the architecture 600 are described and illustrated in connection with FIGS. 1-3.

In some embodiments, the tenant databases 615 are capable of sharing the same installation of the database system software, the same computing resources, and the same system administration. Each tenant database 615 may be self-contained and fully isolated from any other tenant database by having its own clients 515 or tenants, components, resources, including, for example, the index server 110, data volumes 575, log volumes 585, database catalog, repository, and persistence layer. Database objects, including schemas, tables, views, procedures, are generally localized within a tenant database 615. In some cases, queries that are cross-database queries, including, for example, SELECT queries, can be executed across more than tenant database by accessing database objects from multiple tenant databases within the same database system, for example, the source system 605a This allows for clients 515 to connect to multiple tenant databases within the same database system 605. A database system 605 can be identified by a single system identifier (SID). A database included in the database system 605 can then be identified by the SID and the name of the database.

In some embodiments, a tenant database 615 is a separate administrative unit within the database system 605, such as the source system 605a, which can be independently started, stopped and backed up from other tenant databases included in the database system. It can be used to separate independent clients 515 from each other within the same database system by providing an isolated database space for user data and runtime. This isolation allows for minimal interference between the tenant database 615, while they are sharing the same compute resources. In some embodiments, replicating the first tenant database 615a included in the source system 605a results in the second tenant database 615b of the target system 605b having the identical structure and data as the first tenant database 615a. Upon shutting down the first tenant database 615a of the source system 615a and restarting the second tenant database 615b of the target system 615b, the latter is configured to independently apply changes to its data and its replicated state of the first tenant database 615a.

A database system 605 can include at least one system database 610. The system database 610 can own the metadata of the database system 605 and can also contain central metadata available to all other tenant databases 615 included in the database system 605 for read access. Tenant databases 615 can also have their own private metadata that can define tenant-dependent extensions in tenant-dependent tables that are based on standard tables defined by the central metadata. The tenant private metadata can also define tenant private tables. The system database 610 can contain tenant independent application data stored in tenant independent tables that can be read by the tenant databases 615 of the database system 605. In some embodiments, each tenant database 615 is isolated from any other tenant database within the database system 605 so that data from such tenant database cannot be accessed by any other tenant database. If a client 515 needs access to more than one tenant database (for example, to manage these tenant database), it needs to open separate database connections to each index server 110 associated with the tenant databases 615. To improve tenant isolation, each tenant database can be assigned to its own transaction domain to ensure that a transaction is restricted to one tenant database 615 and that a single transaction cannot span multiple tenant databases of the database system 605.

The system database 610 contains information about the database system 605 as a whole and the tenant databases 615 included in the database system 605. In some embodiments, the database system 605 includes only one system database 610. The system database 610 can be used for central administration of the database system 605 by, for example, providing data and users for system administration and being capable to connect to administration tools, such as SAP HANA® cockpit or the SAP HANA® studio. Administration tasks performed in the system database apply to the system as a whole and all of its databases (for example, system-level configuration settings), or can target specific tenant databases (for example, backup of a tenant database). Each tenant database 615 runs its own index server 110 and other servers, for example, a SQLScript processor or an XS engine. Servers, including, for example, a compile server and a preprocessor server, that do not persist data run on the system database and serve all databases of the architecture 600.

In the embodiment illustrated in FIG. 6, only the system database 605 runs the name server 115. The system database 610 stores overall landscape information about the database system 605, including information regarding the tenant databases 615 that exist within the database system 605. For example, the information accessible by the name server 115 includes the assignment of the index servers 110 to particular tenant databases 615. In some embodiments, the system database 610 does not include nor own database-related topology information, which includes information about the location of tables and table partitions included in the tenant databases 615. In another embodiment with data distribution, the name server 115 has access to information about which tables or partitions of tables are located on which tenant database 615.

Database-related topology information is stored in the corresponding tenant database catalogs. The name server 115 may also provide index server functionality for the system database 610. Unlike the name server in a single-container system, the name server 115 of the system database 605 within a multiple-container system architecture does not own topology information, that is, information about the location of tables and table partitions in databases.

In some embodiments, the system database 610 is a central database that includes information about the database system 605, including the global system state and metadata and state of the tenant database 615. In some embodiments, the system database 610 is used for administration purposes of the database system 605, but not for storing user data, which is instead stored in the tenant database 615.

In some embodiments, the second tenant database 615b in the target system 605b is generated by replicating information associated with the first tenant database 615a of the source system 605a, and storing and/or persisting the replicated information in the second tenant database 615, as described in more detail with respect to FIGS. 7A-7F. The replicated information may include, for example, data pages used to transfer the initial data state of the first tenant database 615a, log buffers representing online data changes, metadata about the current state of the first tenant databases 615a or any combination thereof.

In some embodiments, while replicating information from the first tenant database 615a to the second tenant database 615b, logs, including, for example, transaction logs or metadata logs, are generated at the first tenant database 615a. The logs represent the current state of data and metadata, including, for example, data stored in the data volumes and log volumes or in-memory data, at the first tenant database 615a based on changes to the state of the first tenant database 615a that are not included in the replicated information. The logs are sent (transmitted) from the first tenant database 615a to the second tenant database 615b of the target system 605b. They are subsequently stored and replayed (persisted) at the second tenant database 615b to replicate these changes. The logs can include transaction logs and metadata logs in the form of logical, physical, or any similar log type.

Transmission modes may include, for example, synchronous, asynchronous, and fully synchronous, in memory and outside of memory, continuously or discrete, and similar modes. In some embodiments, the information replicated from the first tenant database 615a of the source system to the second tenant database 615b of the target system in an asynchronous mode. Transaction logs sent from the first tenant database 615a to the second tenant database 615b and asynchronously replayed at the second tenant database 615b prior to entering a synchronous mode of processing statements from client applications of the first tenant database 615a. The synchronous mode is entered upon the source system 605a receiving a request for stopping replication of the first tenant database 615a to the second tenant database 615b.

FIGS. 7A-F are system diagrams illustrating replication of a tenant database 705 a source database system, or source system 605a, and a target database system, or target system 605b, according to some embodiments.

It should be appreciated that the system architecture 700, as illustrated in FIGS. 7A-F, is only one example of such architectures replicating a tenant database from a source system to a target system, and that the architecture 700 optionally has more or fewer servers or components than shown, optionally combines two or more servers or components, or optionally has a different configuration or arrangement of the servers or components. The various servers or components shown in FIG. 7 are implemented in hardware, software, or a combination of both, the hardware and software, including one or more signal processing and/or application specific integrated circuits. Additional details regarding an example implementation of the architecture 700 are described and illustrated in connection with FIGS. 1-3 and 6.

Figure 7A:
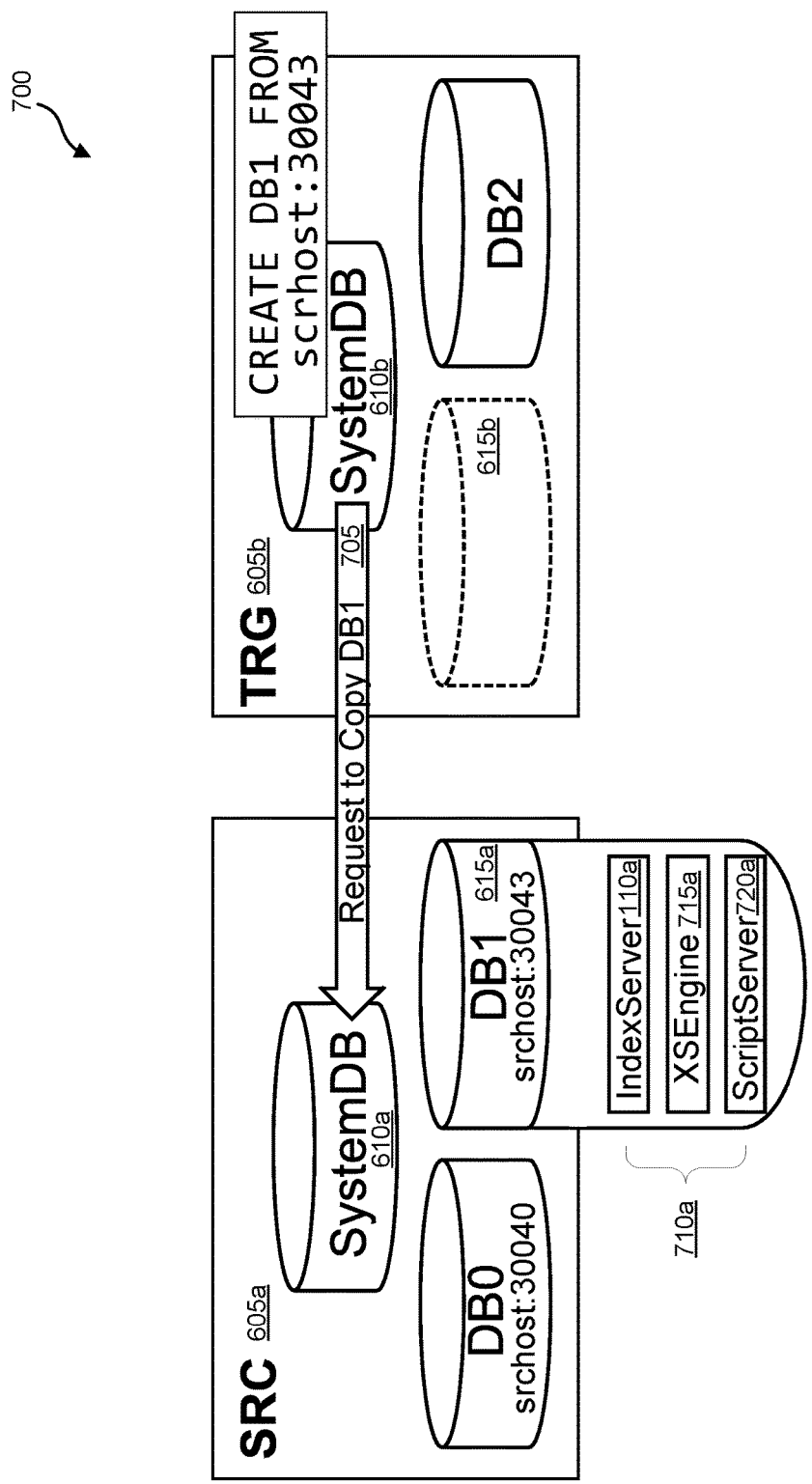
FIGS. 7A-F are system diagrams illustrating replication of a tenant database from a source system to a target system.

In some embodiments, as illustrated in FIG. 7A, the source system 605a receives a request 705 from the target system 605b for replicating the first tenant database 615a. In some embodiments, the system database 610a of the source system 605a receives and processes the request 705 from the system database 610b of the target system 605b. In other embodiments, the source system 605a initiates the replication process of the tenant database 615a by sending a request to the target system 615b and waiting for the target system to respond by sending the request 705. The request 705 may include a SQL statement that is executed by the system database 610a. In some embodiment, the request 705 is communicated via a secure channel that uses a secure mutual authentication between the source system 605a and the target system 605b.

The secure mutual authentication may include the source system 605a generating a temporary certificate and a corresponding key, and then sending the temporary certificate and key to the target system 605b via a secure communication channel. The target system 605b installs (stores) the temporary certificate and key for future authentication and authorization of communications between the two systems. Any subsequent communications between the source system 605a and the target system 605b are authorized and authenticated via the temporary certificate and the key stored on stored both systems.

A secure communication channel may include a channel that communicates by transferring encrypted notifications, messages or data between systems. For example, Secure Sockets Layer (SSL) technology may be used for establishing an encrypted link between the source system 605a and the target system 605b for passing notifications, messages and data between the systems. In some embodiment, the secure communication channel between the source system 605a and the target system 605b uses a permanent authentication certificate that is installed on both systems. This secure communication chancel may include a secure SQL communication channel.

In some embodiments, the secure mutual authentication is primarily used for replicating tenant databases 615 between the source system 605a and the target system 605b. An advantage of the secure mutual authentication includes that it allows a database specific implementation and includes authorization and authentication of both systems. In addition, the temporary certificate may be specific to a particular pair of source and target system. The system database 610 and tenant database 615 may have their own authentication certificate and key. Typically, authentication requests from an untrusted or unknown sender are blocked by the system. The temporary certificate provides a mechanism for the system database 610a of the source system and system database 610b of the target system to recognize each other.

A user intending to use the secure mutual authentication then provides its user credentials to the source system 605a and the target system 605b, which are used in combination with the temporary certificate to authenticate the user on both systems. In some embodiments, the temporary certificate is generated on the source system 605a based on user credentials. Typically, the user is a privileged user, such as system administrator, who has system administration rights on both systems. In some embodiments, the user credentials are associated with a user who is authorized to access the source system and the target system.

Figure 7B:
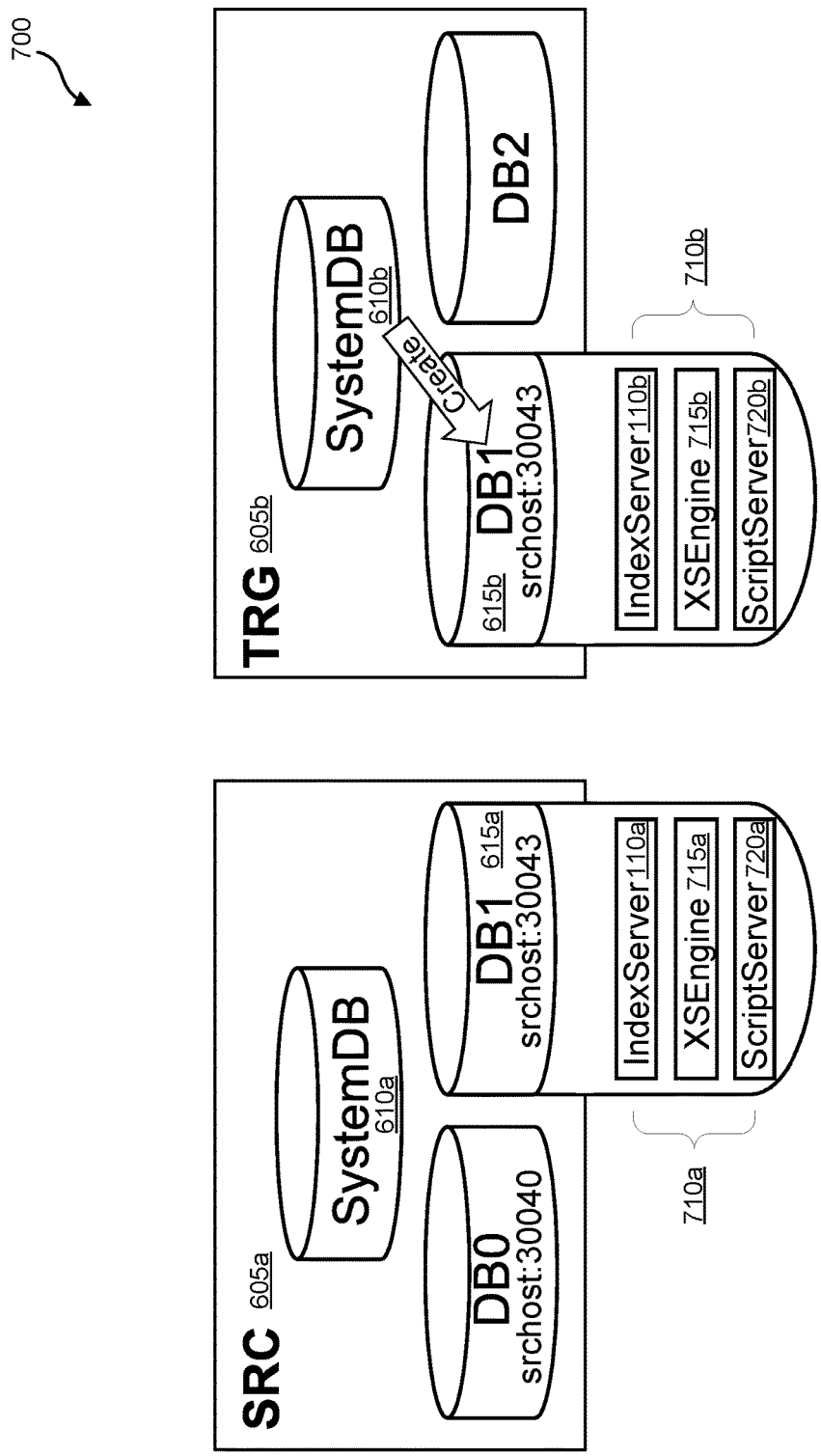

The first tenant database 615a that is replicated (or moved) from the source system 605a to the target system 605b may include one or more first servers 710a. Examples of first servers include the index server 110a, the XS engine 715a, the script server 720a and other servers. Via secure mutual authentication, the source system 605a sends characteristics of the first servers to the target system 605b that generates (creates) a second tenant database 615b including the second servers 710b based at least in part on the received characteristics. Each second server 710b corresponds to one first server 710a having the same characteristics as its corresponding first server 710a. For example, as shown in FIG. 7B, the second tenant database 615b includes the index server index server 110b, the XS engine 715b and the script server 720b that correspond to the index server 110a, the XS engine 715a, and the script server 720a, respectively.

Figure 7C:
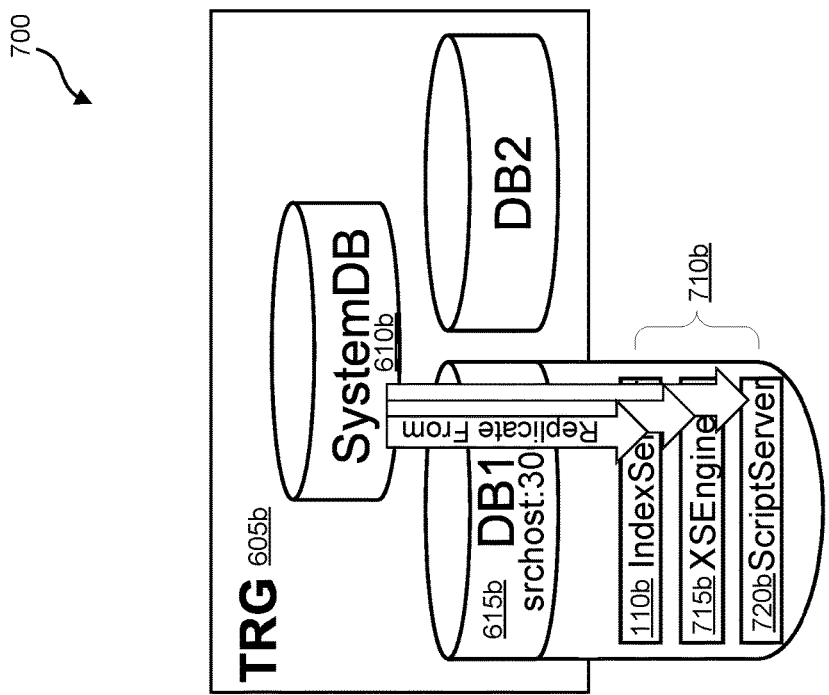
Figure 7C:
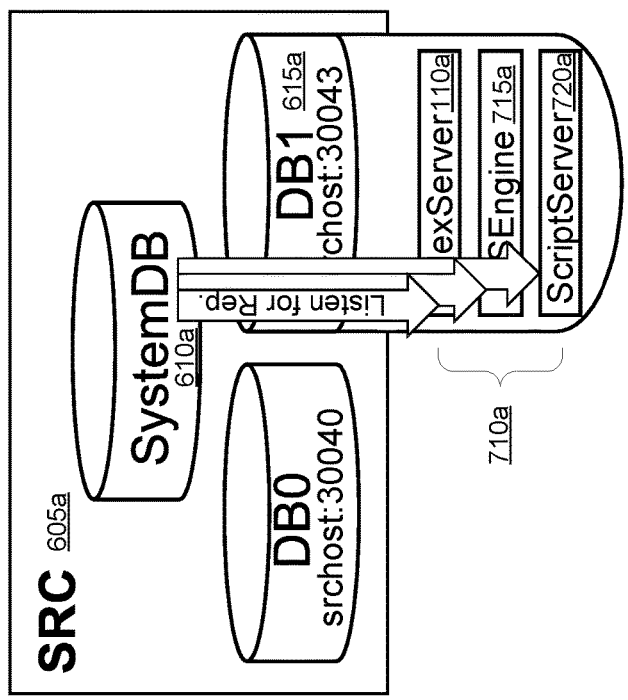

The systems then establish communication channels between each of the first servers 710a and their corresponding second servers 710b for copying the data from the first servers to the second servers. Embodiments to establish such communication channels, as illustrated in FIG. 7C, include the system database 610a of the source system configuring each of the first servers 710a. In addition, the system database 610b of the target system configures each of the corresponding second servers 710b. The configuration prepares the servers 710 for transferring the data between the tenant databases. Information regarding the configuration may include the communication port, the communication protocol, and the like that the servers 710 use to send or receive the replicated data. In some embodiments, the second tenant database 615b is offline, i.e., not accessible by a client or client application. In some embodiments, the first tenant database 615a continues to be online.

Figure 7D:
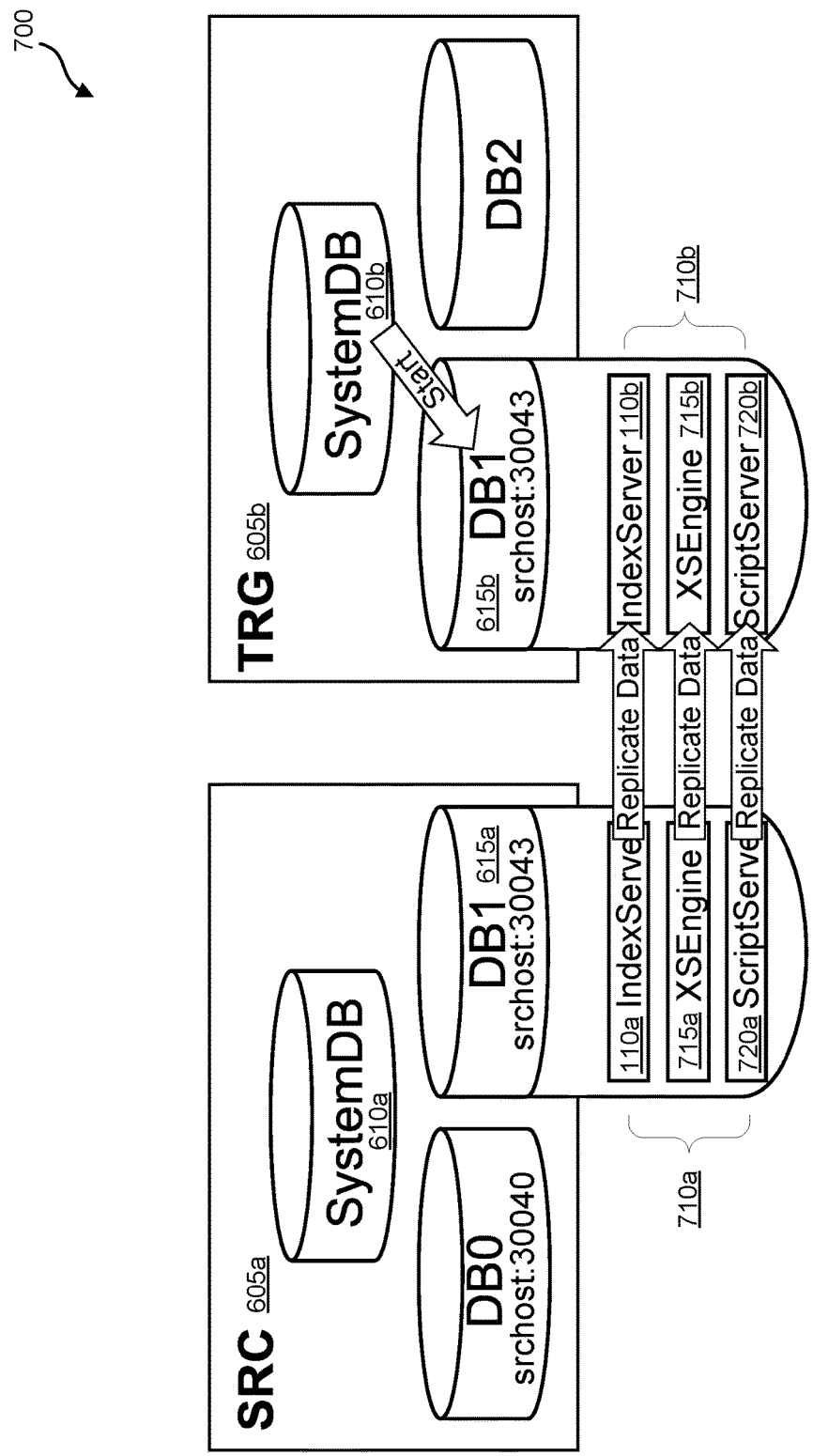

In some embodiments, as illustrated in FIG. 7D, upon completion of the configuration the system database 610b communicates to the second servers 710b to start the replication process by sending a replication. In turn, each second server 710b then connects to its corresponding first server 710a by establishing a secure communication channel using the secure mutual authentication. The second server 710b then sends a request for data replication to its corresponding first server 710a through the open and secure communication channel. Upon receipt of the request, each first server 710a replicates its data by transferring it to the corresponding second server via its open and secure communication channel.

The data may be replicated in an asynchronous mode to avoid slowing or otherwise interfering with the performance of the source system while allowing the source system to stay online during the data replication. The first server 705a may generate logs, such as transaction log, based on statements received from clients or client applications during data replication that are not reflected in its replicated data. In some cases, replicating the data in asynchronous mode results in the source system 605a and the target system 605b being in slightly different states once the replication is complete. For example, transaction logs that are transferred to and replayed at the target system only include transaction statement that have been committed and thus persisted at the source system.

Once the data transfer between the servers has successfully been completed, the second server 710b sends a notification to its corresponding first server 710a that indicates the successful replication of the data. Upon receiving a request for stopping replication of the first tenant database to the second tenant database, the first server 750a and the second server 705b then enter a synchronous mode of processing statements received from client applications while the second server 705b may be offline.

Figure 7E:
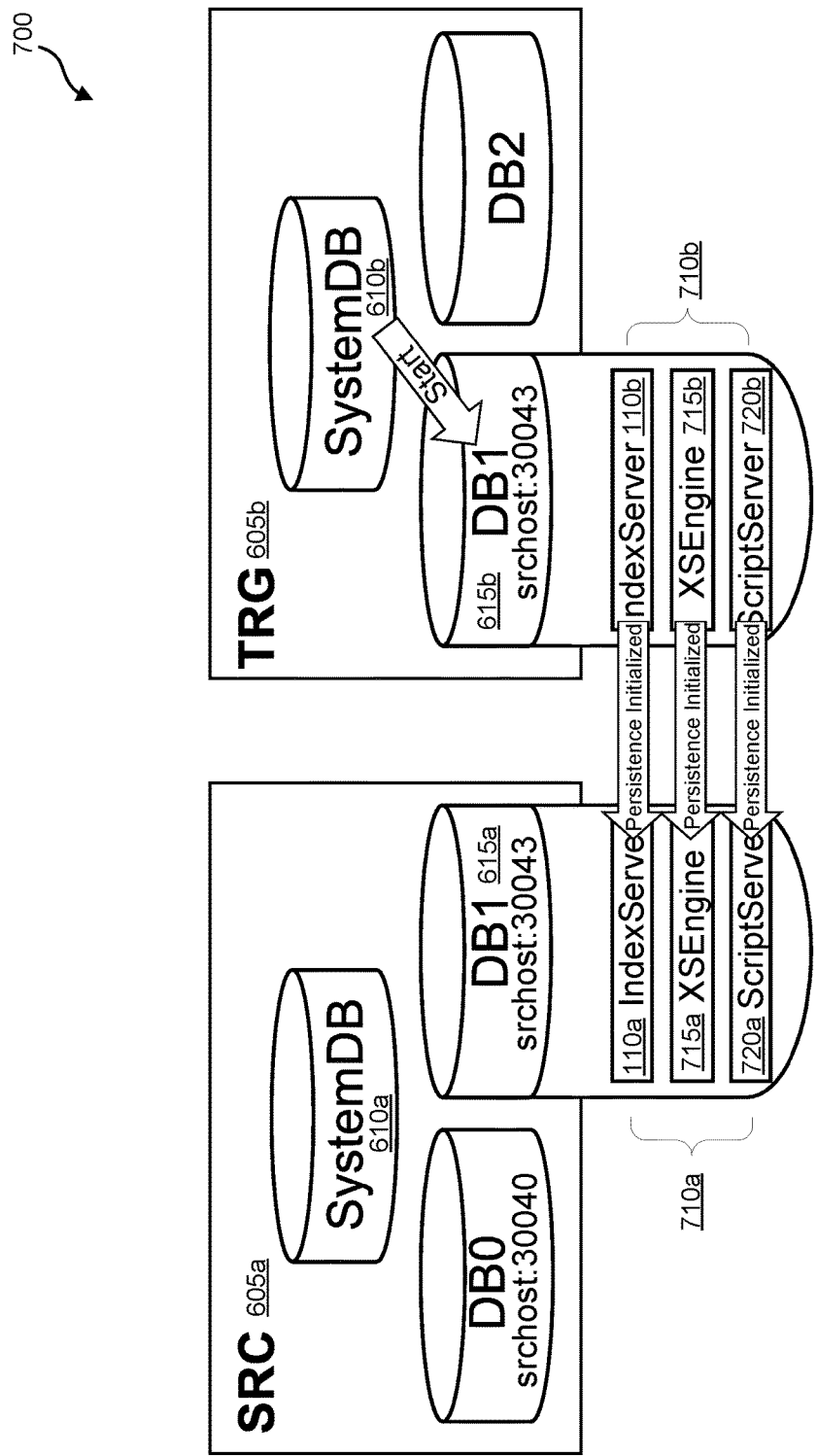

In some embodiments, as illustrated in FIG. 7E, once successful transfer of the data includes that the data has been persisted on the target source 605b. The second server 705b then communicates a notification to first server 705a that indicates that the persistence of the replicated data has been initialized. In some embodiments, the notification includes a persistence flag to indicate whether the persistence of the replicated data has been initialized.

For example, in synchronous mode, an incoming statement is not processed and returned back to the client as processed until all statement prior to the incoming statement are persisted in both servers 705a and 705b. In addition, the incoming statement is processed and persisted on the first server 705b. If successful, the first server 705a sends a log of the statement to its corresponding second server 705b that replays the log to persist the statement on the target system 605b, and, if successful, confirms to the persistence to the first server 705a. In some embodiments, an incoming statement will be replicated as soon as it received by the first server 705a. In some embodiments, logs are sent after the persistence flag is set indicating that the persistence of the second server 705b has been initialized. Upon confirmation by the second server 705b, the first server 705a returns back to the client with the statement marked as complete, if it persisted the statement. Thus, the first server 705a waits until the log is replayed at the second server 705b with the replay confirmed before returning back to the client. In some embodiments, the index server 110a monitors the statements that are processed at the first tenant database 615a of source system during the data transfer.

Figure 7F:
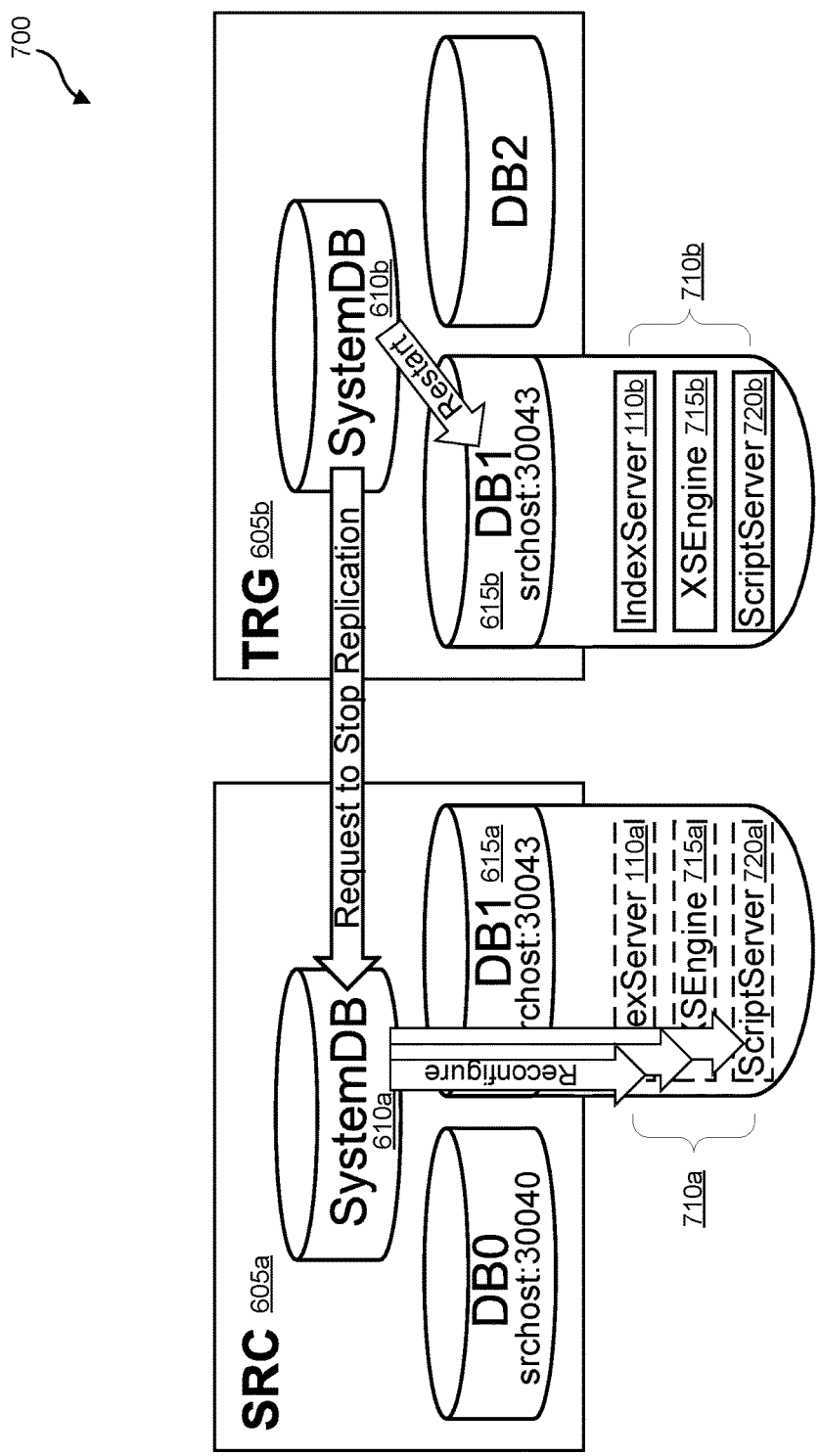

FIG. 7F illustrates stopping replication of the first tenant 605a with the second tenant database taking over client communications, according to some embodiments In some embodiments, instead of a stop request a user can issue a takeover request. In some embodiments, a user can request stopping the replication of a tenant database and/or having the second tenant database take over at any time. In this case, a separate command is received by the target system 605b indicating to stop the replication. In some embodiments, upon receipt of the stop or takeover command, the system database 610b of the target system sends a request to system database 610a of the source system to stop replication. In response to receiving the request, the system database 610a shuts down the first tenant database 615a of the source system. For example, the system database 610a may reconfigure the first servers 710a included in the first tenant database. The system database 610a then communicates to the system database 610b of the target system that the shutdown has been completed. The system database 610b of the target system may then restart the second tenant database 615b to complete the takeover.

In some embodiments, stopping replication of a tenant database includes changing to synchronous replication of data and statements that are newly received by the tenant database of source system and are not reflected in the replicated data. If in synchronous mode, any incoming statements for the tenant database of the source system are blocked from being processed and replayed on the target system prior to the takeover.

In some embodiments, the synchronous replication continues for a short time period of, for example, one, two, or three seconds, before the tenant database of the source system is shutdown and tenant database in the target system takes over. In other embodiments, such time period is less than one second.

Figure 8:
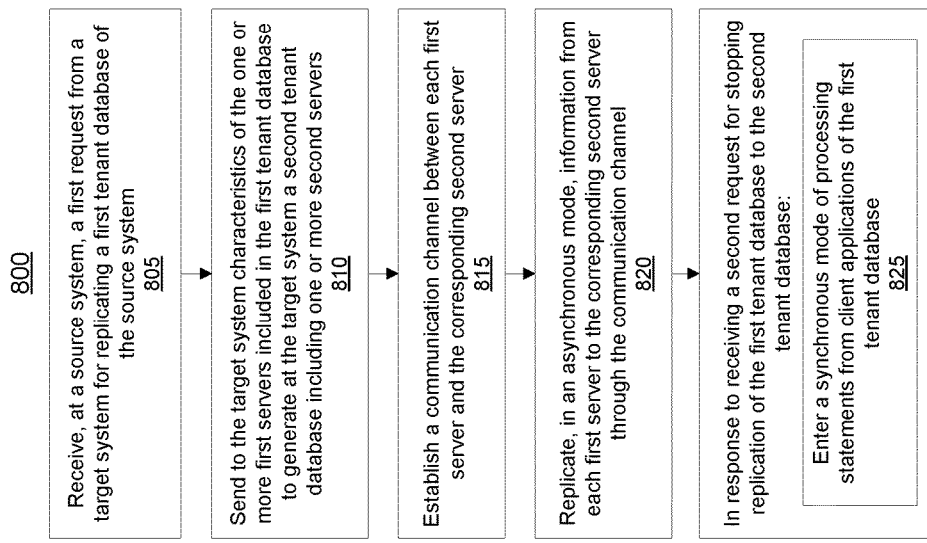
FIG. 8 is a process flow diagram illustrating a method of replicating a tenant database from a source system to a target system.

FIG. 8 is a process flow diagram 800 illustrating a method of replicating a tenant database from a source system to a target system, according to some embodiments. In some embodiments, a first request is received 805, at a source system, from a target system for replicating a first tenant database of the source system. The first tenant database includes one or more first servers. Characteristics of the one or more first servers included in the first tenant database are sent 810 to the target system to generate at the target system a second tenant database including one or more second servers. Each second server corresponds to one first server and has the same characteristics as the corresponding first server. A communication channel is then established 815 between each first server and the corresponding second server. In an asynchronous mode information from each first server is replicated 820 to the corresponding second server through the communication channel. Upon receiving a second request for stopping replication of the first tenant database to the second tenant database, the source systems enters 825 a synchronous mode of processing statements from client applications of the first tenant database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B," "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on." above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for replicating a tenant database from a source system to a target system, the method comprising:
  receiving, at a source system, a first request from a target system for replicating a first tenant database of the source system, the first tenant database including one or more first servers;
  sending to the target system characteristics of the one or more first servers included in the first tenant database to generate at the target system a second tenant database including one or more second servers, each second server corresponding to one first server and having the same characteristics as the corresponding first server;
  establishing a communication channel between each first server and the corresponding second server;
  replicating, in an asynchronous mode, information from each first server to the corresponding second server through the communication channel;
  in response to receiving a second request for stopping replication of the first tenant database to the second tenant database, entering a synchronous mode of processing statements from client applications of the first tenant database;
  wherein:
    the source system includes a first system database and the target system includes a second system database;
    the first request is received by the first system database from the second system database;
    the source system includes a first name server that hosts the first system database and stores information associated with the first tenant database; and
    the stored information associated with the first tenant database includes landscape information associated with the source system.

2. The method of claim 1, and further comprising:
  receiving a statement from a client application of the first tenant database;
  generating a transaction log based on the statement; and
  sending the transaction log to the target system to replay the transaction log at the second tenant database of the target system, and
  in response to processing the statement by first tenant database, sending information to the client application that indicates completion of processing the statement.

3. The method of claim 2, wherein the entering a synchronous mode of processing statements from client applications of the first tenant database includes:

in response to receiving a first notification indicating successful replication of the transaction log at the target system, processing the statement by the first tenant database.

4. The method of claim 2, and further comprising:
prior to entering a synchronous mode of processing statements from client applications of the first tenant database, processing the statement by first tenant database in the asynchronous mode.

5. The method of claim 4, wherein in the asynchronous mode the statement is processed by the first tenant database without waiting for the first notification indicating successful replication of the transaction log at the second tenant database of the target system.

6. The method of claim 1, and further comprising prior to entering a synchronous mode of processing statements from client applications of the first tenant database, receiving a second notification indicating successful replication of the information of the one or more first servers to the corresponding one or more second servers.

7. The method of claim 6, wherein the second notification further indicates that the persistence of the replicated information from each first server to the corresponding second server has been initialized on the corresponding second servers.

8. The method of claim 7, wherein a persistence flag is included in the second notification to indicate whether the persistence of the replicated information from each first server to the corresponding second server has been initialized on the corresponding second servers.

9. The method of claim 1, and further comprising:
in response to receiving a second request for stopping replication of the first tenant database to the second tenant database, initiating the shutdown of the first tenant database upon completion of the synchronous mode of processing statements from client applications of the first tenant database.

10. The method of claim 1, and further comprising
in response to receiving a second request for stopping replication of the first tenant database to the second tenant database:
sending a third request to the target system to restart the second tenant database; and
in response to receiving a third notification from the target system indicating a successful restart of the second tenant database, informing client applications of the first tenant database to redirect requests to the second tenant database of the target system.

11. The method of claim 1, wherein the target system includes a second name server that hosts the second system database and stores information associated with the second tenant database, and wherein the stored information associated with the second tenant database includes landscape information associated with the target system.

12. The method of claim 1, wherein the first tenant database includes a first index server that stores topology information associated with the first tenant database, and the second tenant database includes a second index server that stores topology information associated with the second tenant database.

13. The method of claim 12, wherein topology information associated with a tenant databases includes information corresponding to tables associated with the tenant database, and information corresponding to table partitions associated with the tenant database.

14. The method of claim 12, wherein the second notification indicating successful replication of the information of the one or more first servers to the corresponding one or more second server is received by the first index server of the first tenant databases from the second index server of the second tenant database.

15. The method of claim 1, wherein the establishing a communication channel between each first server and the corresponding second server includes sending to the first server and the corresponding second server information that indicates a port of the communication channel.

16. The method of claim 1, wherein the source system and target system communicate via a secure mutual authentication, the secure mutual authentication including:
sending a temporary certificate and a key from the source system to the target system via a secure communication channel;
installing the temporary certificate on the target system; and
authenticating communications between the source system and the target system through the temporary certificate;
wherein the temporary certificate is generated on the source system based on user credentials that are associated with a user who is authorized to access the source system and the target system.

17. A computer-implemented system for replicating a tenant database from a source system to a target system, the system comprising:
one or more data processors; and
a computer-readable storage medium encoded with instructions for commanding the one or more data processors to perform operations comprising:
receiving, at a source system, a first request from a target system for replicating a first tenant database of the source system, the first tenant database including one or more first servers;
sending to the target system characteristics of the one or more first servers included in the first tenant database to generate at the target system a second tenant database including one or more second servers, each second server corresponding to one first server and having the same characteristics as the corresponding first server;
establishing a communication channel between each first server and the corresponding second server;
replicating, in an asynchronous mode, information from each first server to the corresponding second server through the communication channel;
in response to receiving a second request for stopping replication of the first tenant database to the second tenant database, entering a synchronous mode of processing statements from client applications of the first tenant database;
wherein:
the source system includes a first system database and the target system includes a second system database;
the first request is received by the first system database from the second system database;
the source system includes a first name server that hosts the first system database and stores information associated with the first tenant database; and
the stored information associated with the first tenant database includes landscape information associated with the source system.

18. A computer program product for replicating a tenant database from a source system to a target system, the product comprising:

a non-transitory machine-readable medium storing instructions that, when executed by at least one data processor, cause the at least one data processor to perform operations comprising:
receiving, at a source system, a first request from a target system for replicating a first tenant database of the source system, the first tenant database including one or more first servers;
sending to the target system characteristics of the one or more first servers included in the first tenant database to generate at the target system a second tenant database including one or more second servers, each second server corresponding to one first server and having the same characteristics as the corresponding first server;
establishing a communication channel between each first server and the corresponding second server;
replicating, in an asynchronous mode, information from each first server to the corresponding second server through the communication channel;
in response to receiving a second request for stopping replication of the first tenant database to the second tenant database, entering a synchronous mode of processing statements from client applications of the first tenant database;

wherein:
the source system includes a first system database and the target system includes a second system database;
the first request is received by the first system database from the second system database;
the source system includes a first name server that hosts the first system database and stores information associated with the first tenant database; and
the stored information associated with the first tenant database includes landscape information associated with the source system.

19. The system of claim 17, wherein the target system includes a second name server that hosts the second system database and stores information associated with the second tenant database, and wherein the stored information associated with the second tenant database includes landscape information associated with the target system.

20. The system of claim 18, wherein the first tenant database includes a first index server that stores topology information associated with the first tenant database, and the second tenant database includes a second index server that stores topology information associated with the second tenant database.

* * * * *